United States Patent [19]

Klassen

[11] Patent Number: 5,519,815
[45] Date of Patent: May 21, 1996

[54] IMAGE PROCESSING METHOD TO REDUCE MARKING MATERIAL COVERAGE IN PRINTING PROCESSES

[75] Inventor: R. Victor Klassen, Webster, N.Y.

[73] Assignee: Xerox Corporation, Stamford, Conn.

[21] Appl. No.: 158,874

[22] Filed: Nov. 29, 1993

[51] Int. Cl.[6] ...................................................... G06F 3/12
[52] U.S. Cl. ................................................ 395/109; 358/526
[58] Field of Search ............................... 395/100, 108, 395/109, 111, 117, 132; 358/526, 457, 515, 502

[56] References Cited

U.S. PATENT DOCUMENTS

| | | | |
|---|---|---|---|
| 4,551,751 | 11/1985 | Jung | 358/75 |
| 4,763,190 | 8/1988 | Froelich | 358/79 |
| 4,930,018 | 5/1990 | Chan et al. | 358/298 |
| 4,965,593 | 10/1990 | Hickman | 346/140 R |
| 4,999,646 | 3/1991 | Trask | 346/11 |
| 5,016,191 | 5/1991 | Radochonski | 364/518 |
| 5,031,050 | 7/1991 | Chan | 358/298 |
| 5,068,170 | 11/1991 | Abe | 430/393 |
| 5,084,762 | 1/1992 | Miyakawa | 358/79 |
| 5,126,838 | 6/1992 | Ohsawa et al. | 358/75 |
| 5,233,366 | 8/1993 | Stephany | 346/1.1 |
| 5,237,344 | 8/1993 | Tasaki et al. | 346/140 R |
| 5,335,315 | 8/1994 | Yoshida et al. | 395/109 |
| 5,353,387 | 10/1994 | Petschu et al. | 395/109 |
| 5,359,437 | 10/1994 | Hibi | 358/529 |
| 5,369,510 | 11/1994 | Taguchi | 358/529 |
| 5,386,305 | 1/1995 | Usami | 358/518 |
| 5,402,245 | 3/1995 | Motto et al. | 358/298 |

OTHER PUBLICATIONS

J. A. C. Yule; "Principles of Color Reproduction"; J. Wiley & Sons; 1967.
Klassen; "Reducing Ink Coverage Levels in Binary CMYK Images"; Proc. Soc. Imaging Science & Technology; 46th Annual Conf.–May 1993; pp. 173–175.
Holladay, "Digital Techniques for Producing Under-Colored Halftone Images"; Xerox Disclosure Journal, vol. 8, No. 6, Nov./Dec. 1983 p. 531.
Yule, "Principles of Color Reproduction"; John Wiley & Sons, Inc. pp. 294–327.

*Primary Examiner*—Mark R. Powell
*Assistant Examiner*—Gabriel I. Garcia
*Attorney, Agent, or Firm*—Mark Costello

[57] ABSTRACT

In a device for processing color images preparatory to printing, there is provided a method of reducing marking material coverage in text and line art areas of secondary colors including the steps of: a) determining the locations of text and line art color pixels having excessive marking material coverage; b) upon determining the locations of color pixels having excessive marking material coverage, processing separation pixels to turn OFF a predetermined portion of the separation pixels corresponding to color pixels having excessive marking material coverage; and c) to prevent artifacts from occurring in the pixel reduction step, processing a given area of separation pixels in an order which tends to randomize the turn OFF effect.

12 Claims, 5 Drawing Sheets

IMAGE PROCESSING METHOD TO REDUCE MARKING MATERIAL COVERAGE IN PRINTING PROCESSES

This invention relates to an image processing method for reducing the amount of marking material required to print a colored image, to avoid problems common to the use of excessive amounts of ink.

CROSS REFERENCE

Cross Reference from U.S. patent application Ser. No. 07/917,643 to Klassen filed Jul. 23, 1992 is made.

BACKGROUND OF THE INVENTION

Full color printing has become a desired goal of office products. One type of full color printer which has significant potential for fulfilling such a goal is the ink jet printer. In one common design of such printers, a reservoir of liquid ink is connected to an ink output orifice via a capillary tube. In the tube, a heater element is provided, responsive to an on/off or binary printing signal. When printing is required and a printing signal is directed to the heater element, the heater element rapidly heats ink in the capillary tube adjacent thereto to a gaseous state, producing a pressure differential which expels a droplet of ink from the orifice, directing the droplet to a sheet of receiving material, such as paper. Color printing is accomplished by providing multiple layers or separations of ink on the page. Commonly, colors are provided by subtractive combinations of cyan, magenta and yellow inks. To print black, a combination of equal amounts of cyan, magenta and yellow is printed, or a fourth black ink is used as a substitute. Under color removal, a well known process in the printing arts, can be used to print a single layer of black ink as a substitute for the combination of equal amounts of cyan, magenta and yellow. For a fuller discussion of under color removal and its application to electronically derived or created images, reference is made to J. A. C. Yule, *Principles of Color Reproduction,* (John Wiley & Sons, Inc., New York, 1967), pages 294–327. Other full color printing processes may use dry powder or liquid toners.

A problem of ink jet printers is that the liquid inks used have a finite drying time, which tends to be somewhat longer than desirable. Further, the drying time of any particular area is at least partly a function of the amount of ink deposited on that area. While satisfactory drying times are possible with black-only or single separation printing, once multiple separations are required, the large amount of liquid on the page causes the problems of ink puddling or pooling, bleeding to adjacent image areas, and flow through to the back side of the receiving material. Paper cockle is also a problem due to saturation of the paper receiving material and subsequent rapid drying. Particularly, problems are noted in the printed image at high ink coverage areas, and high coverage areas where high contrast image edges occur. While certain materials variations, such as different inks or special papers may resolve some of these problems, each brings its own distinct problems to the process. While special treated papers optimized for ink jet use are possible, plain papers are preferred from cost and convenience standpoints.

Using one available set of materials, a maximum ink coverage of less than 150% is required, on average, over large areas, for printing without artifacts resulting from too much ink. As used herein, ink coverage refers to the number of ON pixels in a region for all the separations, divided by the total number of pixels in the region in one separation. Without undercolor removal, a typical full color image may require ink coverage in the range of 200–300%. With undercolor removal, maximum ink coverage may be down to 200%, but no lower.

For cost reasons, it is highly desirable for the process to operate irrespective of image content, or on the separation binary bitmaps without further image information. That is, the process should be able to work on any type of image, whether it contain text, graphics, or a halftoned image, without being informed of which portions contain text or halftoned images, or graphics.

While ink jet printing has a notable problem with the case of high ink coverage, other printing processes which are printed on a pixel by pixel basis also have problems with excessive marking material. Notably, electrophotographic printing methods using a pixel by pixel printing process for forming a latent image for development by dry or liquid toner marking materials can suffer from excessive marking material, evidenced by sheet cockling, and curling caused by differential shrinkage of toner and paper in the printing process.

Tasaki and Shiga (U.S. Pat. No. 5,237,344) describe a method for reducing the amount of ink printed to 50%, 75% or 66%. The method uses fixed patterns of turn-off locations (e.g., a checkerboard for 50%) and selects the pattern based on the printing mode (reverse character mode, block graphic mode or normal character mode), the character selected, and possibly the relative humidity. Apparently, the method is designed for single color (black) printing: if it were used for multiple separation (e.g., red formed from yellow and magenta) printing, both separations would be turned off in the same place, resulting in more obvious patterns. The small set of fixed turn-off patterns makes the method very sensitive to line angle, as lines at some angles will have more pixels turned off than others. Also the method is only useful for characters from a built-in font, including graphic characters: arbitrary fonts and shapes, such as are requested in documents created using industry standard page description languages e.g. PCL or PostScript, cannot be handled in this way. U.S. Pat. No. 4,930,018 to Chan et al. teaches the reduction of paper cockle and graininess of ink jet prints. Printing of a given scan line occurs multiple times, with three different dye loadings, with pixels requiring the highest dye loading printed on one pass, pixels requiring an intermediate dye loading printed on another pass, and pixels requiring the lowest dye loading on another pass. The method takes as input continuous tone RGB (red - green - blue) images and performs RGB-CMYK (cyan - magenta - yellow key or black) conversion with full under color removal. As understood, printing is performed at half resolution, so that "pixels" in the input image correspond to 2×2 blocks in the output image. The image data is first error diffused from 8 bits per pixel per separation to 4 bits pixel per separation. Then, for each pixel, a count of up to 4 drops of each dye loading is computed, for each separation. There are multiple choices, ranked in order of total ink coverage. If the highest coverage choice exceeds the maximum allowable coverage, the separation with highest coverage is changed to use a lower coverage value for the same gray level, if possible. If it is not possible to stay at the same gray level, the gray level for that separation is dropped by one, and the error passed on to neighbors. The process iterates until the total ink coverage is as low as required. Pixels within the 2×2 block are assigned values (0 or 1) by proceeding around the block in clockwise order, and filling in pixels in order. First, the high dye load pixels are turned on, then the medium, then the low. Within each dye loading group, first black is turned on, until there are no more black pixels of that dye loading, then the next pixels in the cycle are cyan, until there are no more cyan required, then magenta, and yellow, and then the next dye load group. By maximizing ink coverage and using multiple dye loadings, they reduce the noisiness of the image, and by maintaining the total ink coverage within known limits, they prevent the many problems associated with excessive ink.

U.S. Pat. No. 4,999,646 to Trask teaches limiting coverage to 100% coverage (by the above definition of coverage), or perhaps between 100 and 200% coverage (if 100% corresponds exactly to no white spaces on a page), owing to the circular shape and overlap of print dots. Coverage is limited by using 2×2 super pixels and assigning each one drop per pixel in a combination that depends on the color required. Assuming one bit per separation input with full undercolor removal, there are eight possible colors that could be requested (including white). In order to reduce patterning due to the multiple swaths, two passes are used, each of a checkerboard pattern of pixels (the two passes being offset to provide full coverage). The two pass process allows ink to dry between passes.

While the method taught in U.S. patent application Ser. No. 07/917,643 by Klassen, filed Jul. 23, 1992, reduces ink coverage in business graphics including heavily saturated regions of continuous tone images (see also, Klassen, "Reducing Ink Coverage Levels in Binary CMYK Images", Proc. Soc. Imaging Science and Technology, 46th Annual Conference (May, 1993), pp. 173–175), it leaves all but the boldest text and line art unchanged, except where they are on a colored background of sufficient density. Thus, areas of text with heavy ink coverage, for example the secondary colors formed by combining the primary colorants cyan, magenta yellow and black, which are commonly used to generate red, green or blue text, are observed to bloom significantly compared to black. Because these colors are the three most popular text colors after black, a method to reduce blooming in these colors in text areas is desirable.

SUMMARY OF THE INVENTION

In accordance with the invention, there is provided a method for reducing the amount of marking material used in a printer to reduce marking materials coverage in text and line art portions of an image, while minimally affecting the appearance of the color image.

In accordance with one aspect of the invention, in a device for processing color images preparatory to printing, there is provided a method of reducing marking material coverage in reproduction of areas of text or line art of a fully saturated secondary color, including the steps of: a) determining the locations of text or line art pixels having excessive marking material coverage; b) upon determining the locations of color pixels having excessive marking material coverage, processing separation pixels to turn OFF a predetermined portion of the separation pixels corresponding to color pixels having excessive marking material coverage; and c) to prevent artifacts from occurring in the pixel reduction step, processing a given area of separation pixels in an order which tends to randomize the locations of pixels turned off.

In accordance with another aspect of one preferred embodiment of the invention, the method of detecting fully saturated secondary color text area coverage includes the steps of: a) storing a current scan line for each of three color separations (cyan, magenta, yellow) (hereinafter, CMY) in a scan line buffer; b) pairwise logically ANDing each of the three CMY separations to produce a multi-separation signal indicating, for each pair of separations, the occurrence of plural separations having ON separation pixels at corresponding locations (these are the locations of secondary color pixels); c) logically ANDing each scan line of the multi-separation signal with previous and succeeding scan-lines of multi-separation signals, and logically ANDing each scan line of multi-separation signals with single pixel shifted versions of itself, to produce signals indicating the occurrence of a neighborhood of ON pixels. The result is stored as a binary signal representing a "hot pixel" separation indicating fully saturated coverage locations through the image. The process is repeated over a number of scan lines. Halftones will rarely have neighborhoods of fully saturated color, especially if the method of U.S. patent application Ser. No. 07/917,643 has been previously applied to the image, and accordingly an assumption can be made that this detection process detects fully saturated text and line art areas. In essence it detects those features too small to be detected by the method of U.S. patent application Ser. No. 07/917,643, but likely to present image quality problems if left alone.

In accordance with still another aspect of the invention, the method of determining how many image signals should be set to OFF to reduce excessive coverage includes the steps of: examining whether an image signal pixel is within an excessive coverage location in the image, from an examination of the hot pixel separation. If the pixel is not in an excessive coverage location, the separation signal is passed transparently. Otherwise, some fraction α of separation pixels occurring at hot pixel locations is turned off, where a is a fraction relating to the comparison of fully saturated desired coverage. Turn OFF can occur in accordance with a fixed mask, logically NANDed with the hot pixels and the result logically ANDed with the input scan line. Each different fraction to be turned off would require a new mask. In the best mode, there is provided a method of passing over the region in a path visiting each pixel and turning off some fraction α of the pixels corresponding to excessive pixels evenly dispersed along the path.

In accordance with yet another aspect of the invention, the method of avoiding patterns which might appear as image processing artifacts includes the step of processing pixels within a given area in an order that tends to prevent moiré patterns from arising. Accordingly, a path of processing pixels in accordance with the previously described turn OFF determination is selected so that, for a uniform area and a constant fraction of pixels turned OFF, the turned OFF pixel is at a different position in each scan line. One useful path is an area filling curve. A random path may also be useful.

In accordance with another aspect of the invention, to prevent the occurrence of a coincidence of turn OFF patterns producing a white pixel in an area in which color is desired, there is provided a white pixel prevention arrangement, which assures that at least one separation within a pixel remain turned ON, in spite of the turn OFF indicator.

Acceptable text is usually not the product of halftoning, as halftoning produces unacceptably ragged character edges. Accordingly, in documents where high quality is important, unsaturated colors are unlikely to be selected. Furthermore, the most popular colors for text (after black) are red, blue and green. Accordingly, text and line art is commonly the result of the combination of two fully saturated colors of ink. Secondly, because the problem addressed is confined to relatively thin strokes, unless ink coverage is very close to 200%, there will be insufficient ink to cause significant blooming problems. The method of determining ink coverage operates only on interior portions of the characters, so that no coverage reduction is applied to character edges (edge pixels never appear in the "hot pixel" separation). The image is processed in a multi-scanline context, to prevent patterns from occurring. If the method of U.S. patent application Ser. No. 07/917,643 by Klassen is used, the present invention method does not adversely affect the results of that method.

These and other aspects of the invention will become apparent from the following descriptions to illustrate a preferred embodiment of the invention read in conjunction with the accompanying drawings in which:

FIGS. 1A, 1B and FIGS. 2A, 2B, 2C show the principle of the present invention, where

Figure 3:
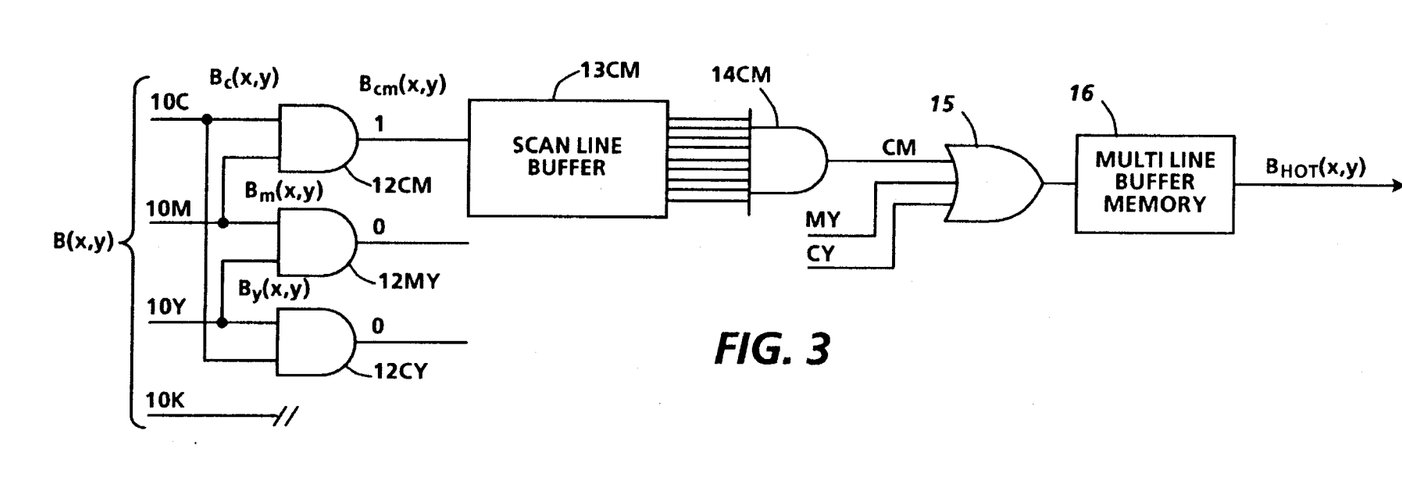
FIG. 3 is a functional block diagram of a system to determine areas of excessive marking material coverage in a color image.

Referring now to the drawings where the showings are for the purpose of describing the preferred embodiment of the invention and not for limiting same, a basic functional block diagram for text area excessive coverage detection is shown in FIG. 3. A plurality of video inputs $10c$, $10y$, $10m$, and $10k$, each representing one of the cyan, magenta, yellow or black separations ($B_N(x,y)$) of color image $B(x,y)$ is directed into the excessive ink coverage system. Separation bitmaps $B_N(x,y)$ are typically binary bitmaps in this system, defined along fast and slow scan axes, describing the image for one separation in terms of 1 bit pixels arrayed in scan lines. Each pixel is an image signal, which may be said to have a condition or image state, which describes for a binary pixel whether a print dot will be made at the output or not. This may also be equated to whether the pixel is ON or OFF, 1 or 0. Thus, there are two image states for any pixel in a binary printer. For a multilevel printer, there may be more than two pixel values, and a similarly larger number of pixel image states. A color pixel, as used herein, is the pixel representing the sum of separation colors. A separation pixel is the corresponding pixel in a single separation.

Figure 1A:
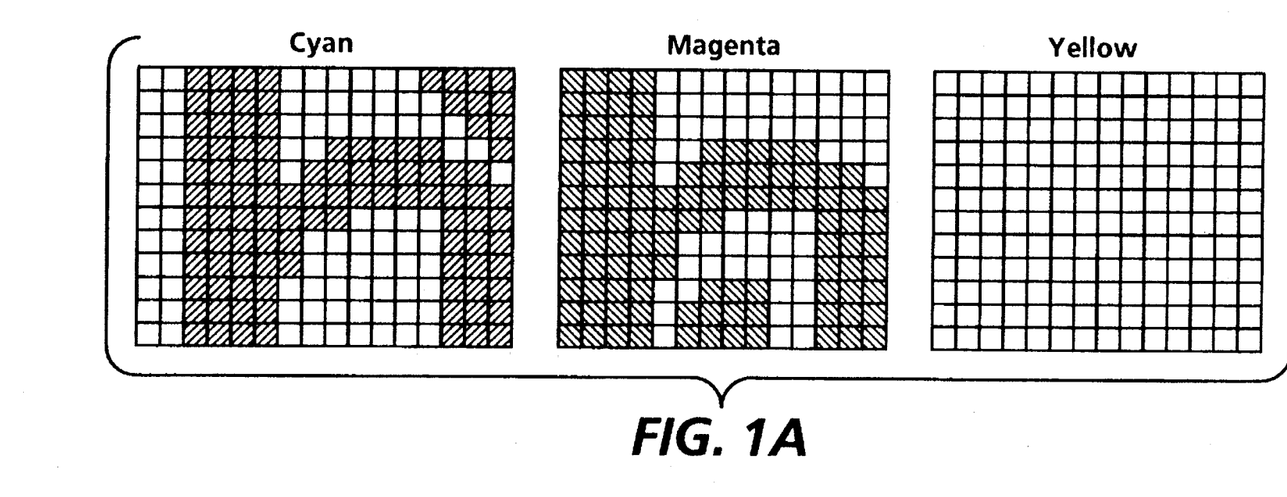
FIG. 1A shows an example initial bitmap for each of three separations.
Figure 1B:
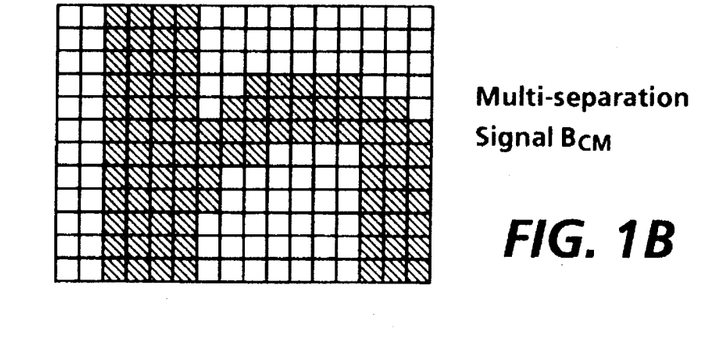
FIG. 1B shows the multi-separation signal.
Figure 2A:
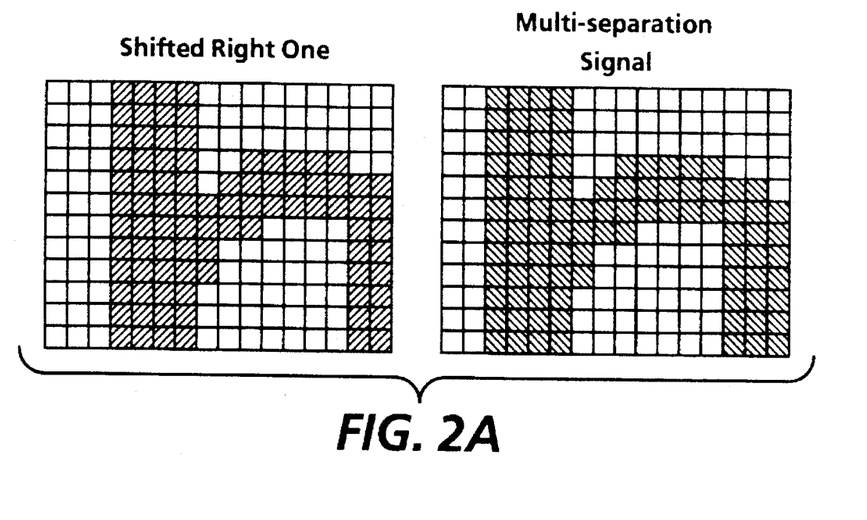
FIG. 2A shows the multi-separation signal and a right-shifted version thereof.
Figure 2B:
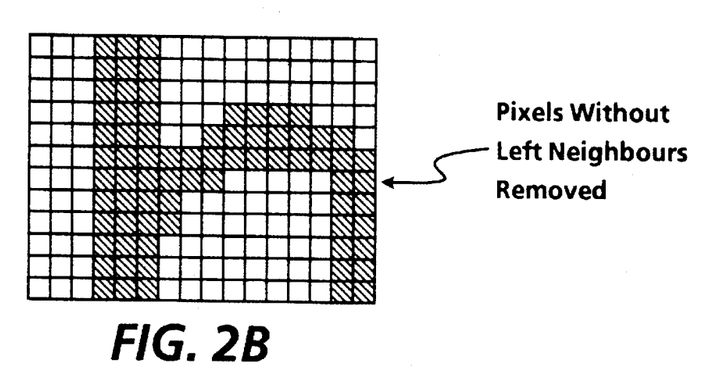
FIG. 2B shows the result of ANDing together the two signals in FIG. 2A.
Figure 2C:
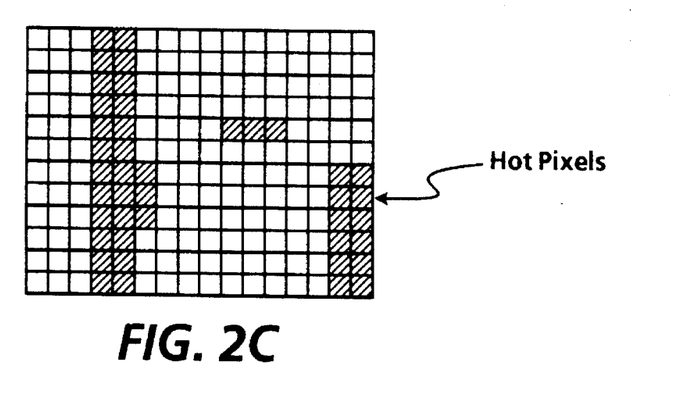
FIG. 2C shows the final set of hot pixels.

At FIG. 3, text areas of excessive marking material ink coverage are determined. A source of image signals, such as a scanner or a computer image generator, produces image separation signals $B_N(x,y)$ at a plurality of video inputs $10c$, $10y$, $10m$, and $10k$. FIG. 1A shows an example video inputs, with pixels ON in the yellow and magenta separations. Each of the color separations $B_C(x,y)$, $B_M(x,y)$, $B_Y(x,y)$ is logically ANDed at AND gates $12_{CM}$, $12_{MY}$ and $12_{CY}$ with each of the other separations to determine whether there are multiple separations turned ON, or to be printed, at corresponding locations. Assuming, for example, that both the cyan and magenta separations have ON pixels at the same locations within the image (indicated by "1's" in each separation), a multi-separation signal $B_{CM}(x,y)$ is generated at AND gate $12_{CM}$ indicating this occurrence. FIG. 1B shows the multi-separation signal for the example image. To determine whether the area is likely to have the problems of excessive coverage, the multi-separation signal $B_{CM}(x,y)$ is stored at scan line buffer $13_{CM}$ for a plurality of neighboring pixels in the same scan line, and in the adjacent scan lines. Typically, a 3×3 neighborhood of signals representing $B_{CM}(x,y)$ will be sufficient for this examination. The multi-separations signals $B_{CM}(x,y)$ for the neighborhood are ANDed together at AND gate $14_{CM}$ to determine excessive material coverage. If signals $B_{CM}(x,y)$ in the neighborhood are ON, a hot pixel ON signal for the center pixel is generated, indicating excessive coverage at that pixel. A hot pixel separation is generated for a plurality of scan lines, by ORing the hot pixel signals from each separation combination at OR gate 15, so that at multi-line buffer memory 16, a signal $B_{HOT}(x,y)$ representing the "hot pixel" or excessive coverage separation is stored. It will no doubt be appreciated that rather than storing an image segment, an appropriate system of logic gates and delays may be used to the same effect. Of course, it also is possible to omit the buffer 16 entirely. This requires redundant computation of the hot pixel signal of any pixel each time it is required, in particular each time it is one of the neighbors of a pixel being considered. The redundant computation might be particularly useful in hardware implementation of the invention, and saves on memory. FIGS. 2A and 2B illustrate the result of ANDing the multi-separation signal $B_{CM}(x,y)$ with a one-pixel-shifted version of itself, so that each pixel is ANDed with its left neighbor. The process is iteratively repeated until each pixel has been ANDed with each pixel in a predetermined neighborhood, and the signal $B_{HOT}(x,y)$, shown at FIG. 2C is obtained.

Figure 4:
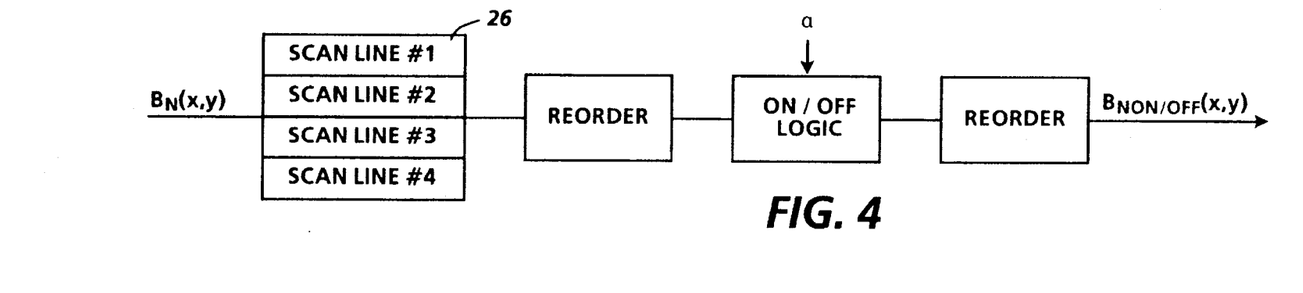
FIG. 4 is a functional block diagram of a system for turning OFF pixels, in accordance with the determination made in FIG. 1.

FIG. 4 illustrates the system turn OFF logic, which operates on the separation signals $B_N(x,y)$ to turn OFF some of the pixels and reduce coverage. Coverage is reduced by fraction α, a ratio selected to represent the number of pixels in an area which must be turned OFF to achieve the desired area coverage. For example, given a region of 100 color pixels at 200% coverage (i.e., 200 separation pixels), where only 140% coverage is desired, 60 separation pixels must be turned OFF, so α is 60/200. This turn OFF ratio is only applied to pixels which correspond to hot pixel locations. All other pixels are passed through the system transparently. In the described process, desired coverage is known for a printing system based on the combination of physical elements, including ink and paper. We assume in the context of the hot pixel decision described in FIG. 3 that 200% area coverage is present. Accordingly, in the present situation, α is usually constant for a given printing system.

Value α is used in ON/OFF logic to apply the turn OFF ratio α to each separation of the image. In one implementation, ON/OFF logic may include a counter, which counts from 0 to 1 by increments of α for each pixel on in $B_C(x,y)$. Upon reaching or exceeding 1, it produces an output indicating that the current pixel should be turned OFF. Another expression for the turnoff logic is given as f=0
for each pixel
  f=f+α
  if(f≧1)
    turn OFF this pixel
    f=f−1
  Next pixel It should be noted then when f+α is greater than 1, f is not reset to 0, but the remainder is retained. Additionally, it will be recognized that by multiplying α by 200, and setting the threshold to which 200α is compared to 200, an integer process can be obtained, which may be easier to implement. This logic is similar to Bresenham's algorithm for drawing lines, which for computer graphics determines the distance along a first axis, before a step must be made in the second axis for a line extending in two axes.

Figure 6:
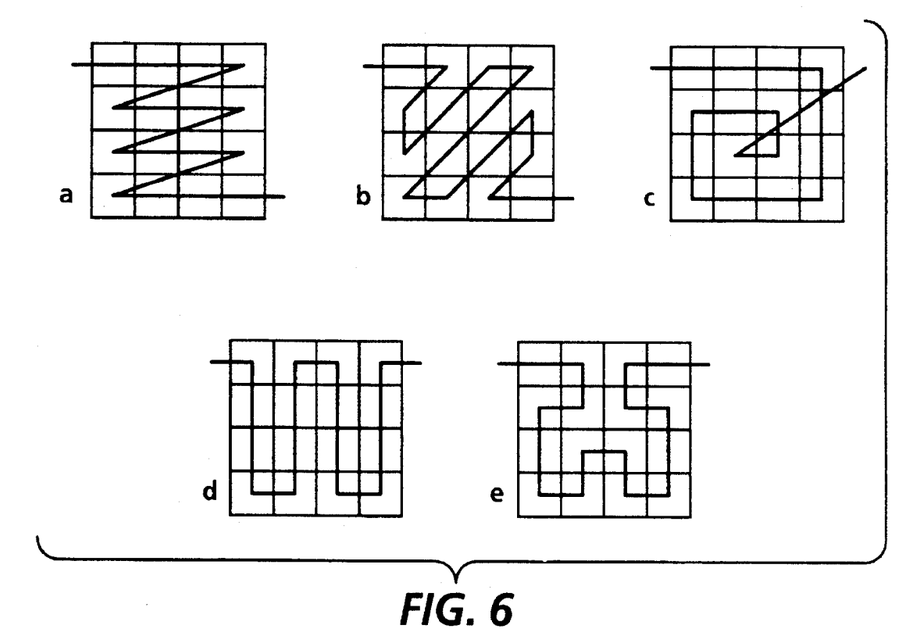
FIG. 6 shows processing paths possible for the prevention of moiré in the turn OFF processing.

As applied to cyan bitmap $B_C(x,y)$, the "turn OFF ratio" α would result in a periodic pattern, which may be visible in the reproduction of the image. Accordingly, one method of alleviating this problem is to randomize the application of the turn OFF ratio to the bitmap. However, it may also be desirable that the determination turn OFF be made with "knowledge" of the determination made for adjacent pixels, so that the application of the turn OFF ratio can be applied uniformly through the given area. Accordingly, and with reference to FIGS. 6a–e, where FIG. 6a shows the usual method of progressing through a bitmap, processing pixels 1 to n, from scan line 1 to scan line k, FIGS. 6b–e show other processing orders. It will no doubt be appreciated that other processing orders are possible, which process pixels in an order that is relatively random with respect to common halftone patterns, and retains dependence on adjacent pixels. Additionally, random processing order is possible.

Accordingly, the system for accomplishing the turn OFF process includes a multi-scan line buffer 20, for storing a plurality of scan lines of $B_N(x,y)$, reordering logic 22, which reads stored image signals out of multi-scan line buffer 20 in an order selected to prevent the imposition of periodic patterns, ON/OFF logic 24, which based on $B_{HOT}(x,y)$, sets the separation to ON or OFF, depending on the state of $B_{HOT}(x,y)$ and reordering logic 26, which returns the pixels to the correct order, to form the signal $B_{NON/OFF}(x,y)$ which is a mask representing the turn OFF function. $B_{NON/OFF}(x,y)$ could be used to represent the altered bitmap, but, it is preferred to process the signal to prevent white pixels.

Figure 5:
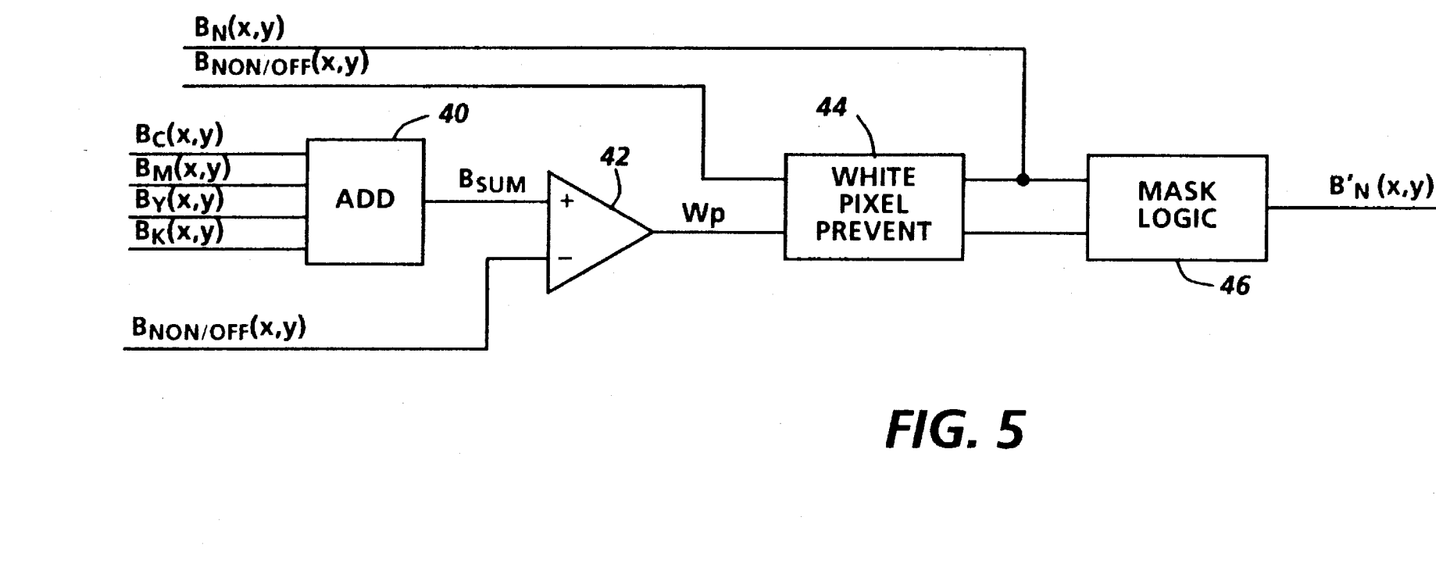
FIG. 5 is a functional block diagram of a system for preventing white pixels from occurring.

With reference now to FIG. 5, white pixel prevent logic is shown. In turning off pixels, it is important to prevent the occurrence of a white pixel from occurring in a colored area. This will occur in the case where, through coincidence, the described system turns off pixels in all the separations, when some color should be present. Accordingly, at FIG. 5, the binary separation pixel value for each separation is summed at adder 40, which produces a signal $B_{SUM}(x,y)$, reflecting the total number of ON separations pixels, at the color pixel. From $B_{SUM}$, the value of 1 is subtracted, whenever a turn OFF indication is made. If the value is less than 1, indicating the potential for a white pixel, an OFF signal in $B_{NON/OFF}$ is converted to an ON signal. Otherwise, the $B_{NON/OFF}$ signal is passed and at mask logic 46, is used to operate on $B_N(x,y)$ to turn OFF the appropriate ratio of signals.

Figure 7:
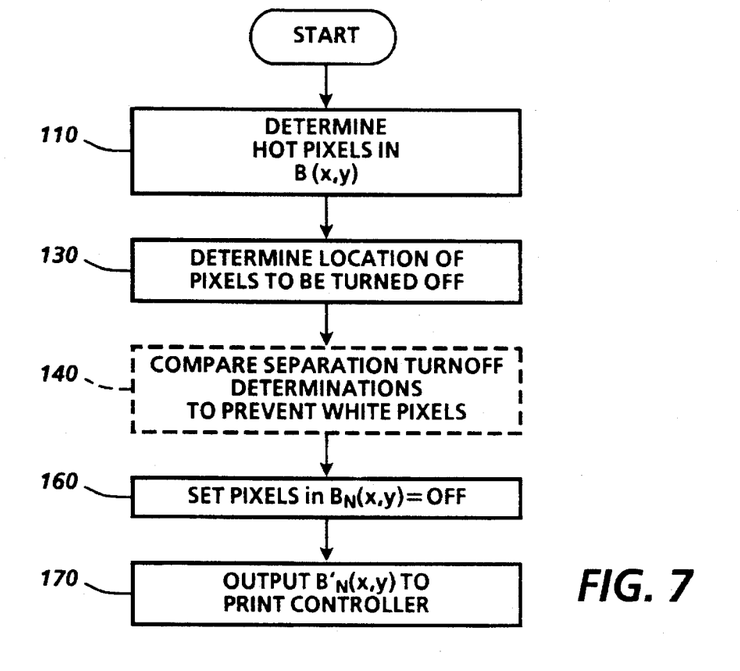
FIG. 7 is a flow chart of the described invention.

FIG. 7 presents the process steps in the described embodiment, which generally include the steps of 110) measuring potential ink coverage in separation N of B(x,y); 130) determining the location in the image of pixels which should be turned OFF in accordance with the turn OFF ratio; 140) comparing each separation with the others to prevent corresponding pixels in each separation from being all turned OFF; 160) setting pixels in the separation of B(x,y) OFF and 170) outputting the adjusted image to a print controller.

Another expression of this algorithm is given in pseudo code notation:

```
while p is valid
    if p.position ε H
        d[p.separation] + = A
        if (d[p.separation] > = 200 ||
            d[p.separation] - = 200;
            H = H - {p.position}
            output.set(p)// set this position in this separation
        end if
    else
        output.set(p)
    end if
    p = Next(p)
end while
```

While the present invention is demonstrated with the above embodiment, there is no doubt many others accomplish the invention. The important aspects of the invention are that highly saturated text printing which might cause bleeding into adjacent areas, can be identified, an ON/OFF ratio can be determined and applied to the pixels in the separations of the image to reduce ink coverage. Preferably, the determination is made in a manner that minimizes moiré, and preferably, makes the determination of OFF or ON in any single separation with knowledge about the state of the corresponding pixels in other separations. The present description assumes a binary or bilevel ink jet printer, but there is no reason in principle that the invention would not apply to a gray or other multilevel printer, where ink coverage is a function not only of the presence of a print dot, but also the gray level value of the print dot. Additionally, while the present invention has been described for fully saturated 200% area coverage, it would be possible to alter this method to find areas of very high saturation but less than 200%, for processing to the same effect.

Other printing processes which are printed on a pixel by pixel basis also have problems with excessive marking material, and may benefit from the described method of reduced marking material use. Notably, electrophotographic and ionographic printing methods using a pixel by pixel printing process for forming a latent image for development with dry or liquid toner marking materials, can suffer from excessive marking material, evidenced by sheet cockling and curling caused by differential shrinkage of toner and paper in the printing process.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method for processing a color document image for printing, to reduce an amount of marking material used to reproduce highly saturated colored portions therein, the color image comprised of multiple separations each defined by a bitmap of image signals arranged in an array of scan lines, including the steps of:

deriving a turn OFF ratio comparing desired marking material coverage percentage determined by a physical printing system, to the maximum potential coverage percentage in a fully saturated color;

receiving the multiple separations color image, and storing the image in a buffer memory;

for each color pixel, producing a multi-separation signal indicating color pixels as highly saturated from the multiple separation color image, when corresponding separation pixels in plural separations are turned ON;

for each color pixel, producing a hot pixel signal by comparison of the multi-separation signal with a predetermined set of neighboring multi-separation signals in the same separation, said hot pixel signal turned ON when a predetermined set of neighboring pixels are turned ON;

receiving the separation bitmaps from the buffer memory and setting some image signals therein to OFF at locations in the color image corresponding to hot pixel signals in at least one separation bitmap of the multiple separation color image, and in accordance with determined turn OFF ratio; and outputting the separation bitmap to a print controller.

2. The method as defined in claim 1, wherein the step of producing a multi-separation signal indicating color pixels as highly saturated from the multiple separation color image when corresponding separation pixels in plural separations are turned ON includes the substep of:

pairwise logically ANDing each separation bitmap with the other separation bitmaps forming the multi-separation color image to produce an output signal representative of color pixel locations where image signals in plural bitmaps are turned ON.

3. The method as defined in claim 1, wherein the step of producing a hot pixel signal by comparison of the multi-separation signal with a predetermined set of neighboring signals in the same separation, said hot pixel signal turned ON when every member of the predetermined set of neighboring pixels are turned ON includes the substep of:

logically ANDing each image signal with the predetermined set of neighbors to produce a hot pixel signal representing areas of color pixels in which substantially all the image signals in plural bitmaps are turned ON.

4. The method as described in claim 1, wherein the step of receiving the separation bitmaps and setting image signals to OFF at locations in the color image corresponding to hot pixel signals in at least one separation bitmap of the multiple separation color image, in accordance with determined turn OFF ratio includes the steps of:

directing each separation image signal to a logic circuit in a predetermined order;

at the logic circuit, producing an ON/OFF signal as a function of the turn OFF ratio and the hot pixel signal;

at the logic circuit, logically comparing the ON/OFF signal with each separation image signal to determine whether the image signal should be turned OFF, and producing a separation mask signal indicative of such comparison;

reordering the signals into an original order from the predetermined order, if required.

5. The method as defined in claim 1, wherein all separation pixels corresponding to the same full color pixel are removed from the HOT pixel set whenever one of the separation pixels forming said full color pixel is turned OFF, thereby preventing the creation of white pixels.

6. A method for processing a color document image for printing at an ink jet printer, to reduce an amount of ink used to reproduce highly saturated colored text portions therein, the color image comprised of multiple separations each defined by a bitmap of image signals representing the deposit of a single color of ink, arranged in an array of scan lines, including the steps of:

deriving a turn OFF ratio comparing the maximum desired coverage percentage, before ink bleeding occurs, to 200% fully saturated color coverage;

for each color pixel, producing a multi-separation signal indicating color pixels as highly saturated from the multiple separation color image when corresponding separation pixels in plural separations are turned ON;

for each color pixel, producing a hot pixel signal by comparison of the multi-separation signal with a predetermined set of neighboring signals in the same separation, said hot pixel signal turned ON when every member of the predetermined set of neighboring pixels are turned ON;

receiving the separation bitmaps and setting image signals to OFF at some locations in the color image corresponding to hot pixel signals in at least one separation bitmap of the multiple separation color image, in accordance with determined turn OFF ratio, thereby reducing the amount of ink specified for reproduction of the color image; and outputting the separation bitmap to a print controller.

7. The method as defined in claim 6, wherein the step of producing a multi-separation signal indicating color pixels as highly saturated from the multiple separation color image when corresponding separation pixels in plural separations are turned ON includes the substep of:

pairwise logically ANDing each separation bitmap with the other separation bitmaps forming the multi-separation color image to produce an output signal representative of color pixel locations where image signals in plural bitmaps are turned ON.

8. The method as defined in claim 6, wherein the step of producing a hot pixel signal by comparison of the multi-separation signal with a predetermined set of neighboring signals in the same separation, said hot pixel signal turned ON when every member of the predetermined set of neighboring pixels are turned ON includes the substep of:

logically ANDing each image signal with the predetermined set of neighbors to produce a hot pixel signal representing areas of color pixels in which substantially all the image signals in plural bitmaps are turned ON.

9. The method as described in claim 6, wherein the step of receiving the separation bitmaps and setting image signals to OFF at locations in the color image corresponding to hot pixel signals in at least one separation bitmap of the multiple separation color image, in accordance with determined turn OFF ratio includes the steps of:

directing each separation image signal to a logic circuit in a predetermined order;

at the logic circuit, producing an ON/OFF signal as a function of the turn OFF ratio and the hot pixel signal;

at the logic circuit, logically comparing the ON/OFF signal with each separation image signal to determine whether the image signal should be turned OFF, and producing a separation mask signal indicative of such comparison;

reordering the signals into an original order from the predetermined order, if required.

10. The method as defined in claim 6, wherein all separation pixels corresponding to the same full color pixel are removed from the HOT pixel set whenever one of the separation pixels forming said full color pixel is turned OFF, thereby preventing the creation of white pixels.

11. A device for processing a color document image comprised of multiple separations each defined by a bitmap of single bit pixels for printing, for the reduction of marking material used in fully saturated areas of the color image, comprising:

an ink coverage input receiving a maximum desired ink coverage percentage for a printing system where the image will be printed;

an image input receiving the multiple separation color image from an image source;

fully saturated pixel identifier including:
a first logic circuit having as inputs each separation bitmap in the color image, and pairwise logically ANDing the separation bitmaps to produce a multi-separation signal; and a second logic circuit having as an input a multi-separation signal, and, for each pixel therein, logically ANDing the pixel with each of a set of neighbors, and producing a hot pixel signal indicative thereof;

turn OFF logic to turn OFF a percentage of the pixels in each separation bitmap accordance with the maximum desired ink coverage received at the ink coverage input including:
  a reader to read each separation bitmap out of the receiving means in a predetermined order;
  ON/OFF logic receiving the separation bitmap from said reading means, and turning OFF a predetermined number of pixels in accordance with the hot pixel signal and the maximum desired ink coverage; and
  a reordering reader to replace pixels in the separation bitmaps into the original image order, if required;
a bitmap output directing the processed separation bitmap to a print controller.

12. The device as defined in claim 11, wherein said turn off logic turning off a percentage of the pixels in accordance with the maximum desired ink coverage additionally includes:

an accumulating circuit adding the separation pixel signals forming a color pixel to form a sum signal;

a decrementing circuit operatively connected to the accumulating circuit, and decreasing the sum signal by an amount equal to the value of one separation pixel whenever the hot pixel signal indicates full saturation;

a comparator operatively connected to the decrementing circuit and a reference signal generator having a value of one separation signal and comparing the decreased sum signal with a signal having a value of one separation signal and producing a response indicative thereof; and a logic circuit operatively connected to the comparator and preventing pixel turn OFF when the comparator response indicates the decreased sum signal is equal to zero.

* * * * *